(12) United States Patent
Costello et al.

(10) Patent No.: US 10,673,799 B2
(45) Date of Patent: Jun. 2, 2020

(54) PRIORITIZATION OF COLLABORATION MESSAGES AND GROUPS

(71) Applicant: CISCO TECHNOLOGY, INC., San Jose, CA (US)

(72) Inventors: John Joseph Costello, Galway (IE); Oliver William Fagan, Galway (IE); Owen Brendan Friel, Galway (IE)

(73) Assignee: CISCO TECHNOLOGY, INC., San Jose, CA (US)

( * ) Notice: Subject to any disclaimer, the term of this patent is extended or adjusted under 35 U.S.C. 154(b) by 85 days.

(21) Appl. No.: 15/584,331

(22) Filed: May 2, 2017

(65) Prior Publication Data

US 2018/0324133 A1  Nov. 8, 2018

(51) Int. Cl.
*H04L 29/08* (2006.01)
*H04L 12/58* (2006.01)
*G06Q 10/10* (2012.01)
*H04L 12/18* (2006.01)

(52) U.S. Cl.
CPC ........... *H04L 51/26* (2013.01); *G06Q 10/107* (2013.01); *H04L 12/1822* (2013.01)

(58) Field of Classification Search
CPC .......... H04L 51/26; H04L 51/32; H04L 12/18
See application file for complete search history.

(56) References Cited

U.S. PATENT DOCUMENTS

| | | | |
|---|---|---|---|
| 9,147,008 | B2 | 9/2015 | Griffin |
| 9,262,531 | B2 | 2/2016 | Ferren et al. |
| 9,282,073 | B1 | 3/2016 | Avital et al. |
| 9,489,657 | B2 | 11/2016 | Chudge et al. |
| 2014/0280890 | A1 | 9/2014 | Yi et al. |
| 2016/0182614 | A1 | 6/2016 | Udupi et al. |
| 2016/0344673 | A1* | 11/2016 | Abou Mahmoud .... H04L 51/26 |

OTHER PUBLICATIONS

"Suggesting Email View Filters for Triage and Search", M. Dredze et al., cs.jhu.edu.

* cited by examiner

*Primary Examiner* — Adnan M Mirza
(74) *Attorney, Agent, or Firm* — Cindy Kaplan

(57) ABSTRACT

In one embodiment, a method includes associating a user with a collaboration group at a collaboration server, tracking activity of participants in the collaboration group at the collaboration server, processing a message received in the collaboration group at the collaboration server, assigning a priority to the message for the user based on the activity of the participants in the collaboration group, and presenting a notification of the message to the user based on the priority of the message. An apparatus and logic are also disclosed herein.

20 Claims, 4 Drawing Sheets

PRIORITIZATION OF COLLABORATION MESSAGES AND GROUPS

TECHNICAL FIELD

The present disclosure relates generally to communication networks, and more particularly, to data driven collaboration.

BACKGROUND

Collaboration rooms (also referred to as chat rooms) have become a common form of communication for both personal and business use. Conventional collaboration systems are very noisy with many different rooms and conversations that may not be particularly useful, but may be prioritized to the top of a messaging queue based on recent activity, with notifications provided in the same way as for rooms or messages that are more relevant and important, and possibly in far greater need of attention and input.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
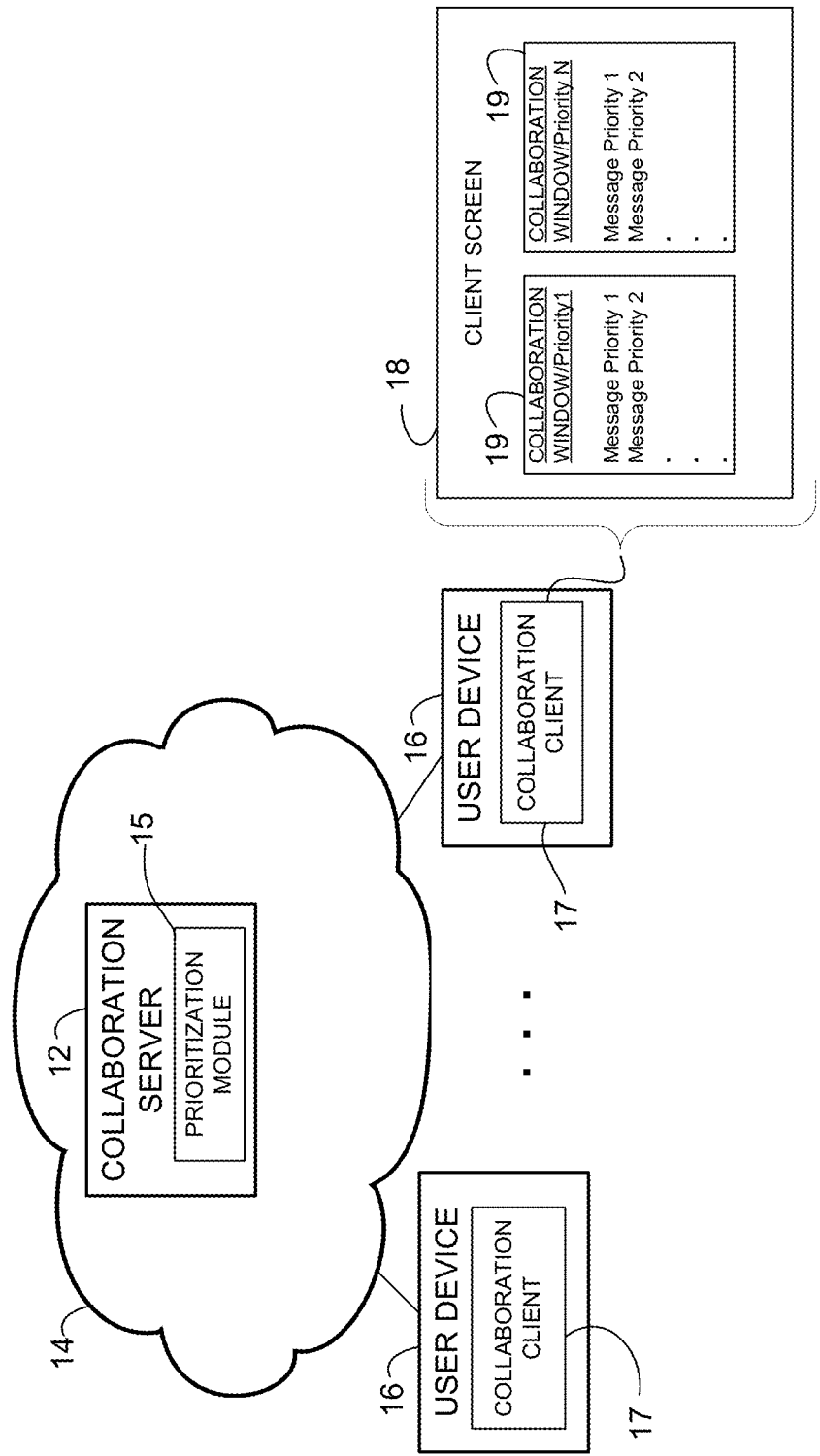
FIG. 1 illustrates an example of a network in which embodiments described herein may be implemented.

In one embodiment, a method generally comprises associating a user with a collaboration group at a collaboration server, tracking activity of participants in the collaboration group at the collaboration server, processing a message received in the collaboration group at the collaboration server, assigning a priority to the message for the user based on the activity of the participants in the collaboration group, and presenting a notification of the message to the user based on the priority of the message.

In another embodiment, an apparatus generally comprises an interface for receiving tracked activity of participants in a collaboration group and transmitting notifications to a user of the collaboration group, a processor for processing a message received in the collaboration group, assigning a priority to the message for the user based on the activity of the participants in the collaboration group, and presenting a notification of the message to the user based on the priority of the message, and memory for storing metrics computed based on the tracked activity and used in assigning the priority.

In yet another embodiment, logic is encoded on one or more non-transitory computer readable media for execution and when executed operable to associate a user with a collaboration group at a collaboration server, track activity of participants in the collaboration group, process a message received in the collaboration group, assign a priority to the message for the user based on the activity of the participants in the collaboration group, and present a notification of the message to the user based on the priority of the message.

EXAMPLE EMBODIMENTS

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Communication networks are often used for collaboration among a plurality of users. Collaboration systems (also referred to chat systems or forums) allow for messages to be sent from a sender to one or more recipients through a computer network almost instantly. A collaboration (chat) client may run on a user's computer and allow the user to communicate with other participants of the chat room using collaboration (chat) services. Collaboration applications may be used by individuals for personal or business communications and allow users to create, meet, message, call, whiteboard, and share, regardless of whether they are working together or apart, in one continuous work stream, before, during, and after meetings.

Messages received during a collaboration session may be presented to a user in a collaboration (chat) window on a user device and the user may maintain multiple sessions and windows. In conventional systems, as new messages appear and the window fills with messages, the oldest messages may be scrolled or otherwise displaced from the window. It is not uncommon for users to have several windows open at one time, each monitoring a separate session. The constant flow of information in simultaneous sessions makes it difficult for a user to effectively monitor incoming messages. There are ways to turn off message notifications for a particular room but this typically needs to be done manually for each room and does not alter the fact that the room still presents itself at the top of the user's queue of unread rooms.

There is a significant cost factor involved in chat room and messaging system maintenance at a single user and overall enterprise level with cost incorporating a combination of time, interruption level, and frustration in having to deal with the frequency of noise involved in maintaining and staying abreast of a multitude of overly chatty messaging rooms.

The embodiments described herein provide prioritization of collaboration groups (rooms) and content based on activities of participants of the collaboration groups. In one or more embodiments, notifications and presentation of collaboration rooms and messages may be targeted in an intelligent, effective, and meaningful way for users of the collaboration rooms. Content presentation of the collaboration room and messages may be adapted for a user based on the usage patterns of other participants in that room.

As described in detail below, one or more embodiments provide an intelligent automated collaboration system that does not require manual user intervention or knowledge to determine the relevance and importance of a collaboration group and content. For example, each collaboration room and message may be assigned a priority based on tracked activity of participants of the collaboration group. The collaboration groups may be appropriately filtered based on tracking information and the content adapted for presentation to a user based on usage patterns of participants of the collaboration groups. One or more embodiments may provide notification to the user of rooms or messages that are more likely to be of significant interest based on the actual trends of how other participants are viewing or responding to messages in the room. Unimportant information may be suppressed or hidden to save the user valuable time in not having to trudge through all of the unimportant information and thereby provide quick and easy access to conversations that are likely to be of most interest to the user.

Referring now to the drawings, and first to FIG. 1, a simplified network in which embodiments described herein may be implemented is shown. The embodiments operate in the context of a data communication network including multiple network devices. The network may include any number of network devices in communication via any number of nodes (e.g., routers, switches, gateways, controllers, access devices, aggregation devices, core nodes, intermediate nodes, or other network devices), which facilitate passage of data within the network. The nodes may communicate over one or more networks (e.g., local area network (LAN), metropolitan area network (MAN), wide area network (WAN), virtual private network (VPN) (e.g., Ethernet virtual private network (EVPN), layer 2 virtual private network (L2VPN)), virtual local area network (VLAN), wireless network, enterprise network, corporate network, data center, Internet, intranet, radio access network, public switched network, or any other network).

The network shown in the example of FIG. 1 includes a collaboration server 12 in communication with a plurality of user devices (endpoints, client devices, hosts, stations) 16 via a network 14. The collaboration server 12 may communicate with the user devices 16 via any number or type of network devices and may provide collaboration services to any number of clients over one or more networks 14.

The user device 16 may comprise, for example, a desktop computer, laptop computer, appliance, mobile phone, tablet, personal digital assistant, video or audio endpoint device, or any other user device. The user device 16 may be a managed or unmanaged device. For example, a user may attempt to access the network 14 from a corporate-managed personal computer, personal network-accessible device, or public terminal. The user device 16 may be a wired device or wireless device, or configured for both wired communication (e.g., connected to a docking station) and wireless communication. A plurality of users may communicate within one or more collaboration groups through the collaboration server 12.

The term "collaboration server" as used herein may refer to one or more network devices, systems, or services operable to provide chat or communication services for a plurality of users in a collaboration group. The collaboration server 12 may, for example, be a stand-alone device or may comprise a group of network devices operable to provide a distributed collaboration service (e.g., cloud-based service) in one or more networks. As described below, the collaboration server 12 may include information gathering services and one or more databases for storing tracking information.

The collaboration server 12 may provide a collaboration suite for use by groups or teams in meeting, messaging, calling, creating, white boarding, and sharing ideas in a continuous work stream before, during, or after meetings. In one or more embodiments, the collaboration server 12 may be in communication with one or more boards or displays to provide white boarding and video conferencing, and one or more audio or video devices for use in a conference room. The collaboration server 12 may be any type of device that facilitates online chat discussions such as a server that maintains one or more collaboration groups (also referred to as rooms).

Communications including, for example, instant messaging, text messaging, or transfer of any type of content including, for example, text, voice, graphics, audio, video, files, documents, and the like, may be supported by the collaboration server 12. The collaboration server 12 may be used to enable one-to-one or team persistent messaging and content. In one or more embodiments, the collaboration server 12 may allow a user to get another user's attention by mentioning (tagging) a user's name in their message. Users may also be able to select one or more favorite spaces or flag a message transmitted in the collaboration group. Messages or files received at or transmitted by the collaboration server 12 may be encrypted in accordance with any suitable encryption (e.g., HTTPS or other format). The collaboration server 12 may also provide user authentication or be in communication with one or more authentication servers (not shown).

As described in detail below, the collaboration server 12 includes a prioritization module 15 operable to prioritize collaboration groups and content, and select a format for notifying a user of a new message (e.g., pop-up notification, prioritized ordering in list of messages, highlighted message, etc.) based on activity of participants within the collaboration group.

The collaboration server 12 may further include a database (local, remote, distributed) for collecting activity tracking information within the collaboration group, as described below with respect to FIG. 4. The database may also store messages along with priorities for each message and collaboration group, and user information.

Tracking information may include participants' dwell time and scroll pattern within a room, message read patterns, message responses, content re-read, attachment previews, or any other tracking information. In one example, dwell time may take into account the number of new messages displayed on the client device 16 and the average time that each unread message is rendered to the user. Scroll depth may measure how many new messages on clicking into a room are actually read by tracking whether a user actually scrolled back to view the new messages. Other tracking information may include how often a message is re-read or what percent of users look at room content attachment previews. The system may also track which posts are read by the user so that the priority of rooms containing read posts by the user can be increased. Tracking information may be attained by a collaboration client 17 at the user device 16 and transmitted to the collaboration server 12, as described below.

The collaboration client 17 (e.g., application, software, module, logic) at the user device 16 is configured to communicate with the collaboration server 12 to facilitate communications between any number of users within one or more collaboration groups (rooms). The collaboration client 17 may be a stand-alone application or integrated into an operating system of the user device 16 or another application executing on the user device, such as a web browser.

The user device 16 also comprises a display screen 18 for presenting one or more collaboration (chat) windows 19, which may be presented on the screen based on prioritization by the prioritization module 15 at the collaboration server 12, as described in detail below. One or more messages or notifications may appear in each window 19. For example, a collaboration session may comprise a list of prioritized messages from a sender to one or more recipients, who view sent and received messages in the collaboration client 17 that provides the collaboration room window 19 on the computer screen 18. As described further below, messages within a collaboration session may be presented in an order based on a priority determined by the prioritization module 15 or one or more messages may be highlighted or filtered based on a priority assigned to the message. It is to be understood that any number of windows 19 comprising any type or number of messages or notifications may be displayed on the client screen 18 in any format, size, shape, or arrangement.

In one or more embodiments, users of the collaboration system may be associated with one or more groups or teams and corresponding collaboration spaces. Thus, within a collaboration group, a user may have a defined relationship (e.g., partner, team member, team leader, associate, etc.) with a participant or a set (group) of participants within the collaboration group. As described below, a relationship between a user and one or more other participants may be used in prioritizing messages within the collaboration group or prioritizing the collaboration group relative to other collaboration groups. The relationship between different users within a collaboration group may be identified in a database stored at the collaboration server 12 or a remote database such as an authentication server or other database that provides user information.

The term "user" as used herein may refer to a user profile, user device, or any other identifier associated with a participant in the collaboration group.

The collaboration server 12 may track activity of participants of the collaboration group, assign metrics to one or more activities, weight the metrics, and utilize an algorithm to calculate priorities for collaboration rooms and messages. For example, the collaboration server 12 may collate the activity tracking information using an algorithm that takes into account weighting inputs (system or user specific) and use the prioritized outputs to decide how to present notifications to individual users. A notification may be presented to a user in the form of a notification pop-up, highlighted message, audio sound, flag, prioritized ordered lists of conversations and curated content, or any combination of these or other notification formats.

It is to be understood that the network devices and topology shown in FIG. 1 and described above is only an example and the embodiments described herein may be implemented in networks comprising different network topologies or network devices, or using different protocols, without departing from the scope of the embodiments. For example, the network may include any number or type of network devices that facilitate passage of data over the network (e.g., routers, switches, gateways, controllers), network elements that operate as endpoints or hosts (e.g., servers, virtual machines, clients), and any number of network sites or domains in communication with any number of networks. Thus, network nodes may be used in any suitable network topology, which may include any number of servers, accelerators, virtual machines, switches, routers, appliances, controllers, or other nodes interconnected to form a large and complex network, which may include cloud or fog computing. Nodes may be coupled to other nodes through one or more interfaces employing any suitable wired or wireless connection, which provides a viable pathway for electronic communications.

Figure 2:
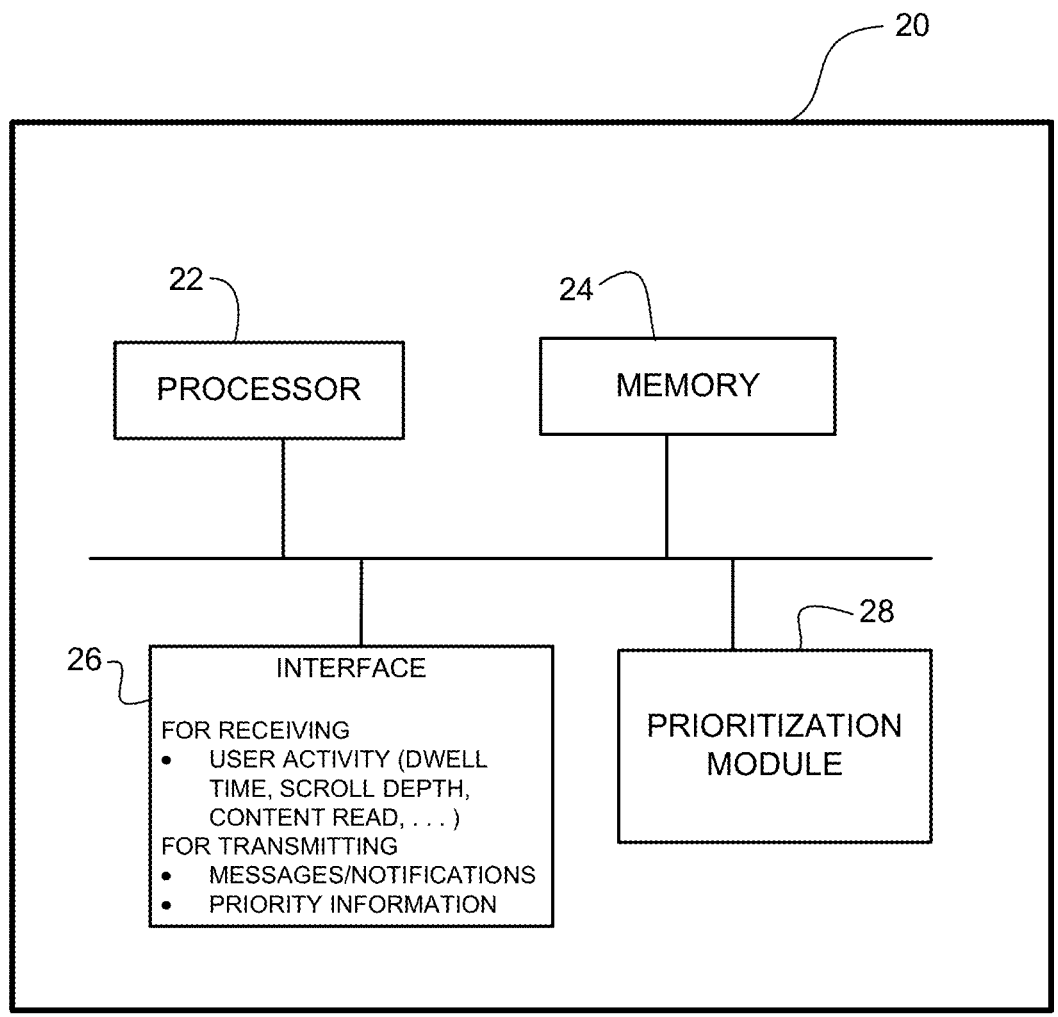
FIG. 2 depicts an example of a network device useful in implementing embodiments described herein.

FIG. 2 illustrates an example of a network device 20 (e.g., collaboration server 12 in FIG. 1) that may be used to implement the embodiments described herein. In one embodiment, the network device 20 is a programmable machine that may be implemented in hardware, software, or any combination thereof. The network device 20 includes one or more processor 22, memory 24, network interface 26, and prioritization module 28.

Memory 24 may be a volatile memory or non-volatile storage, which stores various applications, operating systems, modules, and data for execution and use by the processor 22. Memory 24 may include, for example, one or more databases for storing user information, activity data, prioritization data, network data, collaboration groups, or other information. One or more components of the prioritization module 28 (e.g., code, logic, software, firmware, application, database) may also be stored in memory 24. The network device 20 may include any number of memory components.

Logic may be encoded in one or more tangible media for execution by the processor 22. The processor 22 may be configured to implement one or more of the functions described herein. For example, the processor 22 may execute codes stored in a computer-readable medium such as memory 24 to perform processes described below with respect to FIG. 3. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The network device 20 may include any number of processors 22.

The network interface 26 may comprise any number of interfaces (linecards, ports) for receiving data or transmitting data to other devices. As shown in FIG. 1, the interface provides for communication with the plurality of endpoints 16 associated with users belonging to one or more collaboration groups. The interface 26 may, for example, receive user information including user activity (e.g., dwell time, scroll depth, content read, etc.) and transmit collaboration messages, notifications, and associated priority information. The network interface 26 may include, for example, an Ethernet interface for connection to a computer or network. The network interface 26 may be configured to transmit or receive data using a variety of different communication protocols. The interface 26 may include mechanical, electrical, and signaling circuitry for communicating data over physical links coupled to the network.

The user device 16 (FIG. 1) may also include a processor 22, memory 24, and interface 26, as shown in FIG. 2. One or more components of the collaboration client 17 (e.g., software, logic, module, database) may also be stored in memory 24. The interface 26 may be used to transmit messages and user information such as user activity with respect to one or more collaboration groups, and receive messages, notifications, and related priority information. As previously noted, the interfaces 26 for the user device may be wired or wireless.

It is to be understood that the network device 20 shown in FIG. 2 and described above is only an example and that different configurations of network devices may be used. For example, the network device 20 may further include any suitable combination of hardware, software, algorithms, processors, devices, components, modules, or elements operable to facilitate the capabilities described herein.

Figure 3:
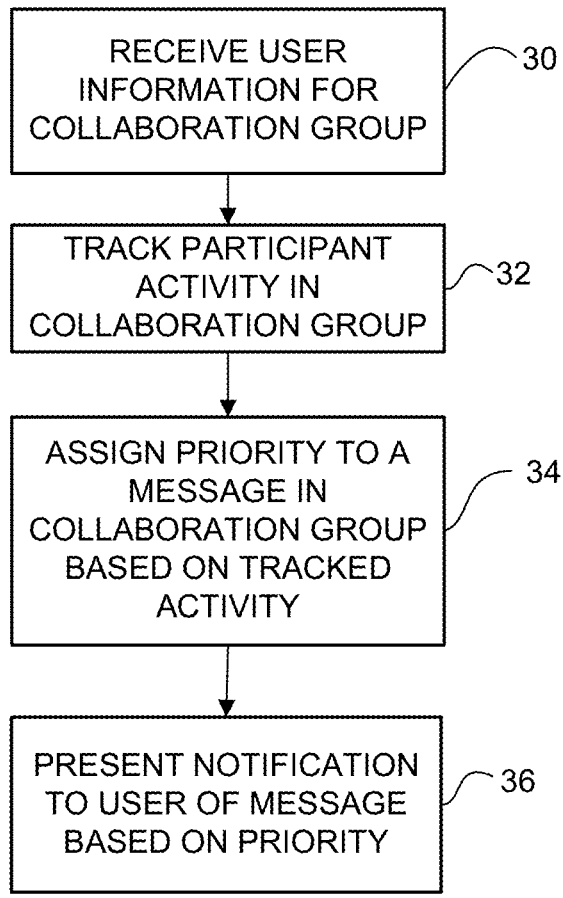
FIG. 3 is a flowchart illustrating an overview of a process for prioritization of collaboration messages, in accordance with one embodiment.

FIG. 3 is a flowchart illustrating an overview of a process for prioritization of collaboration groups and messages, in accordance with one embodiment. The collaboration system (e.g., collaboration server 12 in FIG. 1) receives user information for one or more collaboration groups at step 30. The collaboration server 12 may, for example, store user information in one or more local or remote databases or request user information when the user logs in. A user may be identified, for example, at a login operation by entering a username and password or a user may be identified based on the device 16 on which the collaboration client 17 is executed. The information may include, for example, identification of users within a group or team, relationship of users within the group, interaction or privacy information, and the like. One or more organizations, groups, or teams that the user is associated with and a relationship between the user and one or more other participants may be obtained at the login process or a lookup may be performed for the user in a database (e.g., team list, organizational hierarchy).

The collaboration server 12 tracks user activity along with all other participant activity for a collaboration group (step 32). Tracking may include, for example, gathering information on one or more collaboration rooms based on message read patterns, scroll patterns (scroll depth, scroll speed), dwell time, clicks (clicks and click through rate), skips, content sharing, forwarding of messages, responding to messages, re-read of messages, preview or download of room content attachments, time spent in room or conversations, or any combination of these or other activities by the user and other participants. This data may be analyzed and interpreted by the collaboration system 12, and based on the information gathered, the system may assign a priority to one or more messages transmitted in the collaboration group (step 34). In one example, system or user based prioritized weightings may be applied. The collaboration system 12 presents a notification to the user of a new message in a format based on the message priority (step 36). The notification format may include, for example, presenting the message in a prioritized message list, providing a message notification pop-up, highlighting a high priority message, playing an audio sound for a high priority message, filtering or hiding a low priority message, moving a room containing one or more high priority messages to the top of a room list, or any other type of notification. The collaboration system 12 may also create a per user prioritized list of rooms. In one example, when the user clicks on a collaboration room, the user will be presented with a prioritized message or messages, based on prioritization lists created at the collaboration server.

It is to be understood that the process shown in FIG. 3 and described above is only an example and that steps may be added, combined, deleted, or modified without departing from the scope of the embodiments. As described above with respect to FIG. 2, the processor 22 may be configured to perform one or more steps shown in FIG. 3.

As previously described, the collaboration system may target notifications and presentation of collaboration rooms and adapt content presentation of collaboration rooms to a room participant based on the usage patterns of the user and other participants in the room. The following describes examples of activity tracking that may be used by the system in determining how to prioritize rooms and messages, and present notifications to a user, and how priorities may be computed and applied to notifications.

In one embodiment, a percentage of content that is actually read by a participant may be tracked, along with what percentage of participants (or a set of participants) in that room read the content. This may be done, for example, by monitoring dwell times for participants or determining how often and how far the participants have scrolled back up in a room to see the content. This information may be used to automatically rate (prioritize) the collaboration room, content, and messages for a user so that the content may be tailored appropriately to be presented to the user.

In one or more embodiments, dwell time and scroll depth may be used in creating a prioritized weighting for a room or content in the room. Dwell time and scroll depth may include historical data for the user or other participants. The collaboration system may measure the user's individual dwell time and scroll depth within every room, and also measure the average dwell time and scroll depth for all users (participants) within each room.

The tracked scroll depth for a collaboration room may be more granular than scroll depth for webpages and may explicitly measure how many new messages are actually read in a room upon clicking into the room by tracking whether a user actually scrolled back to view new messages. The scroll depth may be used to accurately determine whether users are merely clicking into a room to mark it as 'read' or whether they are actually scanning the full new content of the room.

The dwell time may take into account the number and overall size of new messages that are displayed on the user device. The collaboration system may also measure the average time that each unread message is rendered to the user, and determine if the user is simply scrolling through messages too fast to actually read them.

Average scroll depth and dwell times may be tracked per organization, team, or user, for example. These metrics may be refined by the collaboration system over time and the system may determine if either metric is higher or lower than average for particular rooms.

The system may also identify important messages based on dwell time. For example, if the average dwell time is high for a message, then the system may flag the message as being relatively important. The relative importance may differ depending on what rooms a user is in or what teams the user belongs to. In one example, if the dwell time for a particular message is high for all members of a user's team, then it may be an important message that the user will want to read. The collaboration system may notify users of the particular room containing the message and additionally flag the message within the room as being important.

In one or more embodiments, the collaboration system may be configured to track how often room contents are re-read. For example, the system may track how often users revisit already read rooms, and how often users re-read particular messages for use in identifying important rooms and messages. This may also be done on a per organization, team, or user basis.

The collaboration system may also track the percentage of users that look at room content attachment previews, how many thumbnails they preview, how many users download room content attachments, or any combination of these or other metrics. The metrics may be more granular, for example, if the user's immediate team members are previewing or downloading content. The collaboration system may then notify users of the room and additionally flag particular content within the room as being important. The same techniques may also be applied in tracking how many participants and which participants click on URL (Uniform Resource Locator) links.

The collaboration system may also track inclusion of a keyword or name within room content. For example, the system may track how many @mentions (tagging) there are for the user or the user's immediate team members in unread content in one or more rooms. If the user's immediate team members are being mentioned in a room, the notification rank of the room may be increased for the user.

In one or more embodiments, the collaboration system may track what posts the user reads and raise the notification priority of rooms containing unread posts by those users. Similarly, a metric may track room content that is read, forwarded, saved, or downloaded by participants in the room. In one example, the system may track activity based on who read the content. For example, if over fifty percent of the user's own team members read more than eighty percent of the content in a particular room (or spent a certain amount of time scanning content in the room), then it is far more likely to be of relevance to the user, in which case the user would likely prefer notifications for new posts to that room to be presented in a priority manner and the user may also want to be shown notifications independent of the user's setting or ensure that the room is at the top of the user's room reading list when the user next access the messaging client.

Similarly, if very few users in a room (or a very few in a certain set of trusted peers or other set of participants) read or respond to particular content, then it is unlikely to be of interest to the user, in which case the relevance or weighting may be reduced for notifications in that room (at least for a current period of time) and not presented as a top priority room in the user's 'unread' rooms list (e.g., filter it in other less important ways).

The system may provide a relative weighting to one or more relevant metrics, and based on this weighting determine a format in which to display room notifications (e.g., new message or content, move a room to top of list). In one or more embodiments, the collaboration system may be self-learning. For example, the system may determine that the user always clicks on the fourth or fifth unread room, in which case it can adjust the weighting of the relevant metrics so that those rooms will begin to move up in relative priority.

All of the information described above may be attained at a user's client level and sent back to the cloud based messaging server 12, which in turn collates the information using an algorithm that takes into account simple or complex weighting inputs (system or user specific) and uses the prioritized outputs to decide how to present notifications to individual users. Based on the activity tracking and weighting inputs, a priority may be calculated for a collaboration room or content in a collaboration room. The priority of a room may be based at least in part on the priority of messages or other content in that room. Similarly, the priority of a message may be based at least in part on the priority of the collaboration group in which the message is transmitted.

The term "priority" as used herein may refer to a relative priority that may be used to provide an ordered list of rooms, content, or messages or may be a rating or ranking (e.g., high, normal, low, 1, 2, 3, . . . ) applied to individual rooms or messages. The priority of a room may be used, for example, in determining where on a room reading list to place the room. The priority of a new message may be used, for example, in determining how or if to present a notification of the message to the user. The notification may include, for example, a notification pop-up, prioritized ordered list of conversations or messages, curated content of a room, highlighted content, filter of message, flag of message, update priority of room containing message, or any combination these or other notifications.

It is to be understood that the tracking, metrics, and notifications described above are only examples, and other types of activity may be tracked or other metrics or notifications may be used, without departing from the scope of the embodiments.

Figure 4:
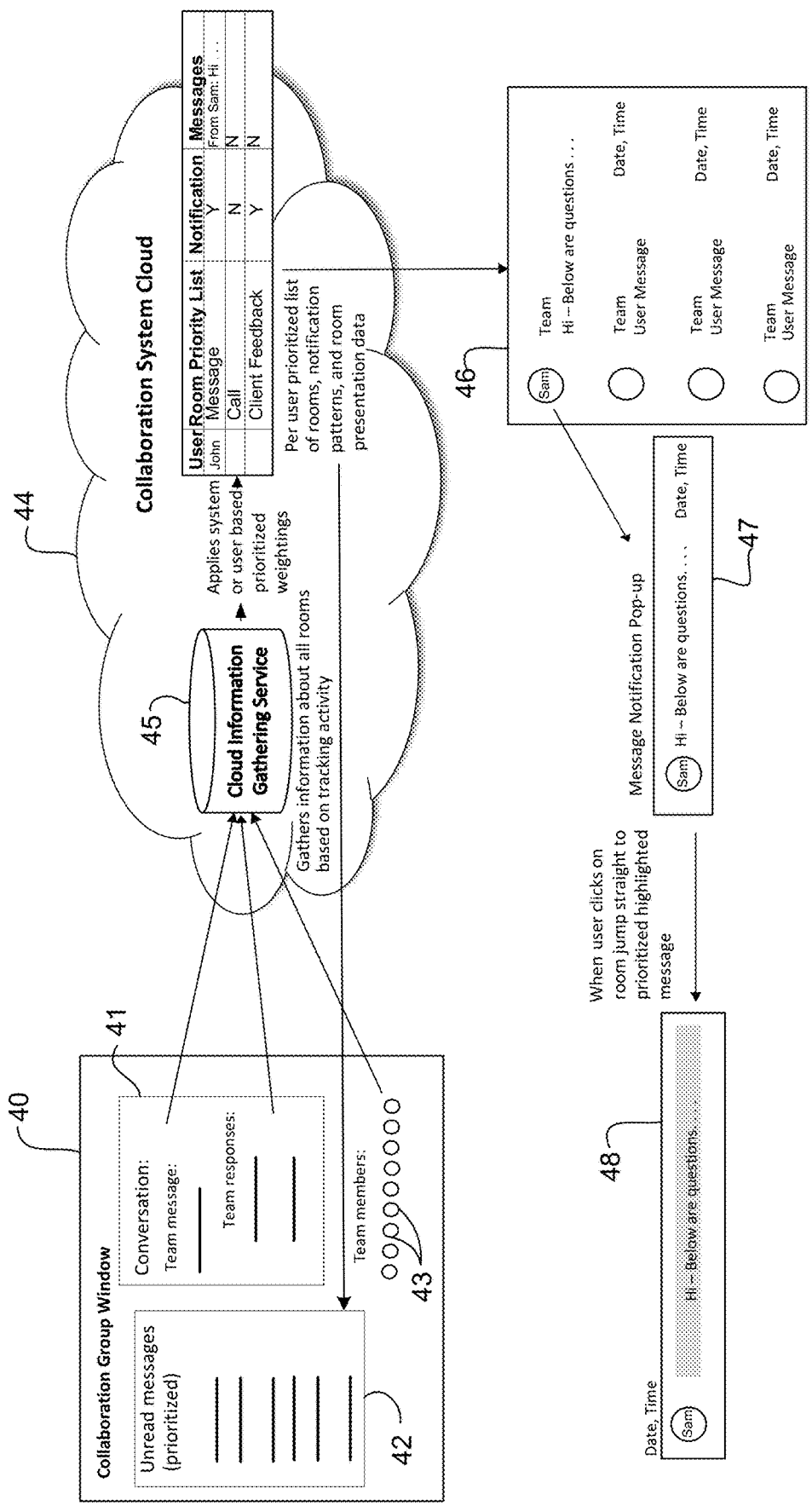
FIG. 4 is a schematic illustrating intelligent and targeted messaging notifications, in accordance with one embodiment.

FIG. 4 illustrates an example of intelligent and targeted messaging notifications and filtering, in accordance with one embodiment. A collaboration group window at a collaboration client is shown at 40. The window 40 may include, for example, a conversation area 41 that shows a user's current messaging in a chat room. A list of unread messages 42 that have been prioritized by the system are also shown in the chat window. The window 40 may also include a participant list showing the current participants or team members in the chat room. Each participant in the chat room may be represented by an icon 43 containing a picture or name of the participant, for example.

A collaboration system cloud (distributed collaboration server) 44 may include a cloud information gathering service and database 45, which gathers information about all rooms. Information may include, for example, message read patterns, scroll patterns, dwell time, who responded to particular messages in the room, time spent in the room or section of a conversation, or any other information relating to participant activity in the collaboration room. The collaboration system 44 collects the system in or more databases 45 and applies system or user based prioritized weightings, as previously described.

In the example shown in FIG. 4, a per user prioritized list is shown with a room priority list and indication as to whether a notification should be sent for a message. Box 46 shows a list of messages with the first message identified as a priority message. The system notifies the user of the high priority message with a message notification pop-up 47. When the user clicks on the room, he can jump straight to the prioritized highlighted message as shown at 48.

It is to be understood that the system shown in FIG. 4 is only an example and that other formats, tables, arrangements, or notifications may be used, without departing from the scope of the embodiments.

As can be observed from the foregoing, one or more embodiments described herein may provide numerous advantages. For example, one or more embodiments provide advantages including cost and effectiveness of delivering an innovative and automated way of filtering communication noise, thereby allowing users to be far more productive. This will become more important as collaborative enterprise messaging systems become more prevalent in the workplace and users have the need to use them efficiently amidst the plethora of information that will pervade such systems, and without such methods, such systems may be rendered ineffective and unusable.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:
1. A method comprising:
  associating a user with a collaboration group at a collaboration server providing a collaboration space shared by a plurality of participants for use in sharing content by the participants;

tracking activity of the participants in the collaboration group at the collaboration server, wherein said activity comprises usage patterns of the participants in the collaboration group;

processing a message received in the collaboration group at the collaboration server;

assigning a priority to the message for the user based on said activity of the participants in the collaboration group; and presenting a notification of the message to the user based on said priority of the message;

wherein said tracking activity of the participants in the collaboration group comprises monitoring action taken by said participants for the message and tracking one or more of message read patterns, scroll patterns, and content sharing by the user and other of said participants in the collaboration group.

2. The method of claim 1 further comprising assigning a priority to the collaboration group relative to other collaboration groups, wherein said priority of the message is based at least in part on said priority of the collaboration group.

3. The method of claim 1 wherein tracking activity comprises measuring dwell time of the participants within the collaboration group, said dwell time based on a number of messages displayed and a time that the messages are displayed on a participant's device.

4. The method of claim 1 wherein tracking activity comprises measuring scroll depth of the participants within the collaboration group, said scroll depth based on a number of messages read by the participants.

5. The method of claim 1 wherein tracking activity comprises monitoring re-read of contents of the collaboration group.

6. The method of claim 1 wherein tracking activity comprises monitoring action taken by said participants for attachments to messages in the collaboration group.

7. The method of claim 1 wherein assigning said priority comprises analyzing dwell time and scroll depth for a set of said participants based on a relationship between said participants and the user.

8. The method of claim 1 wherein said priority is based at least in part on said tracked activity for a specified set of said participants having a defined relationship with the user.

9. The method of claim 1 wherein assigning said priority comprises weighting said tracking activity and running an algorithm using weights to assign said priority.

10. The method of claim 1 wherein presenting said notification comprises presenting a message notification pop-up for high priority messages.

11. The method of claim 1 wherein presenting said notification comprises inserting the message into a prioritized ordered list.

12. An apparatus comprising:
an interface for receiving tracked activity of participants in a collaboration group and transmitting notifications to a user of the collaboration group, wherein said tracked activity is based on monitoring of action taken by said participants for a message received in the collaboration group;

a processor for processing the message received in the collaboration group, assigning a priority to the message for the user based on said activity of the participants in the collaboration group, and presenting a notification of the message to the user based on said priority of the message; and memory for storing metrics computed based on said tracked activity and used in assigning said priority;

wherein said tracked activity comprises dwell time of the participants within the collaboration group, said dwell time based on a number of messages displayed and a time that the messages are displayed on a participant's device.

13. The apparatus of claim 12 wherein said priority is based at least in part on a priority of the collaboration group relative to other collaboration groups.

14. The apparatus of claim 12 wherein said tracked activity comprises scroll depth of the participants within the collaboration group, said scroll depth based on a number of messages read by the participants.

15. The apparatus of claim 12 wherein assigning said priority comprises analyzing dwell time and scroll depth for a set of said participants based on a relationship between said participants and the user.

16. Logic encoded on one or more non-transitory computer readable media for execution and when executed operable to:
associate a user with a collaboration group at a collaboration server;
track activity of participants in the collaboration group;
process a message received in the collaboration group;
assign a priority to the message for the user based on said activity of the participants in the collaboration group; and
present a notification of the message to the user based on said priority of the message;
wherein said tracked activity of the participants in the collaboration group comprises action taken by said participants for the message including one or more of a message read pattern, scroll depth, dwell time, and content sharing by the user and other of said participants in the collaboration group, wherein said scroll depth indicates whether the participants scanned content in the collaboration group and said dwell time indicates an average time that each unread message is rendered to the participants.

17. The logic of claim 16 further comprising logic for assigning a priority to the collaboration group relative to other collaboration groups, wherein said priority of the message is based at least in part on said priority of the collaboration group.

18. The logic of claim 16 wherein said priority is based at least in part on said tracked activity for a specified set of said participants having a defined relationship with the user.

19. The method of claim 1 wherein said content is shared by two or more of the participants in a continuous work stream.

20. The method of claim 1 wherein the collaboration server provides team persistent messaging and content within the collaboration group.

* * * * *